W. G. JOHNSON.
CHECK ROW COTTON PLANTER.
APPLICATION FILED AUG. 13, 1913.
1,101,801.
Patented June 30, 1914.
2 SHEETS—SHEET 1.
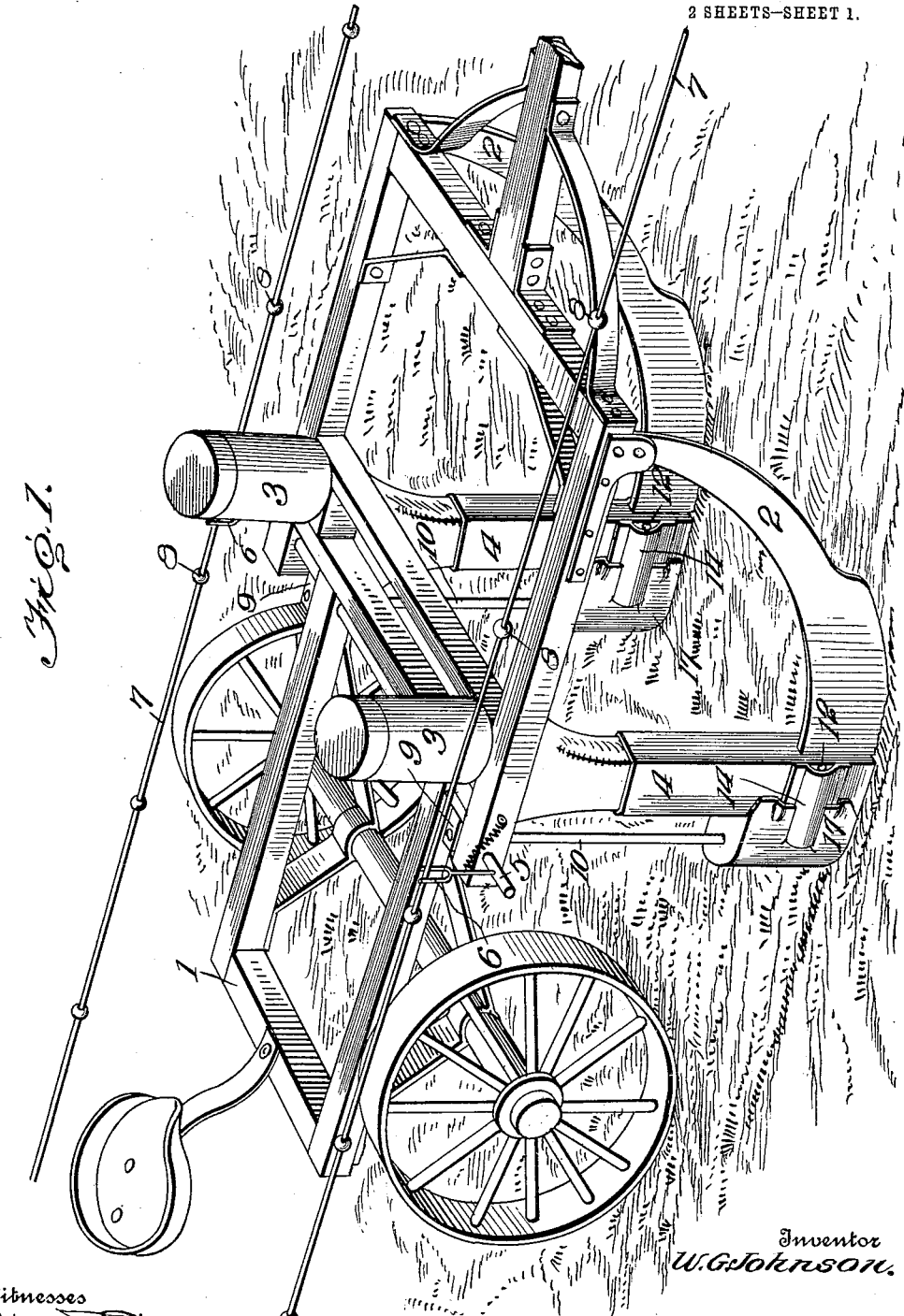

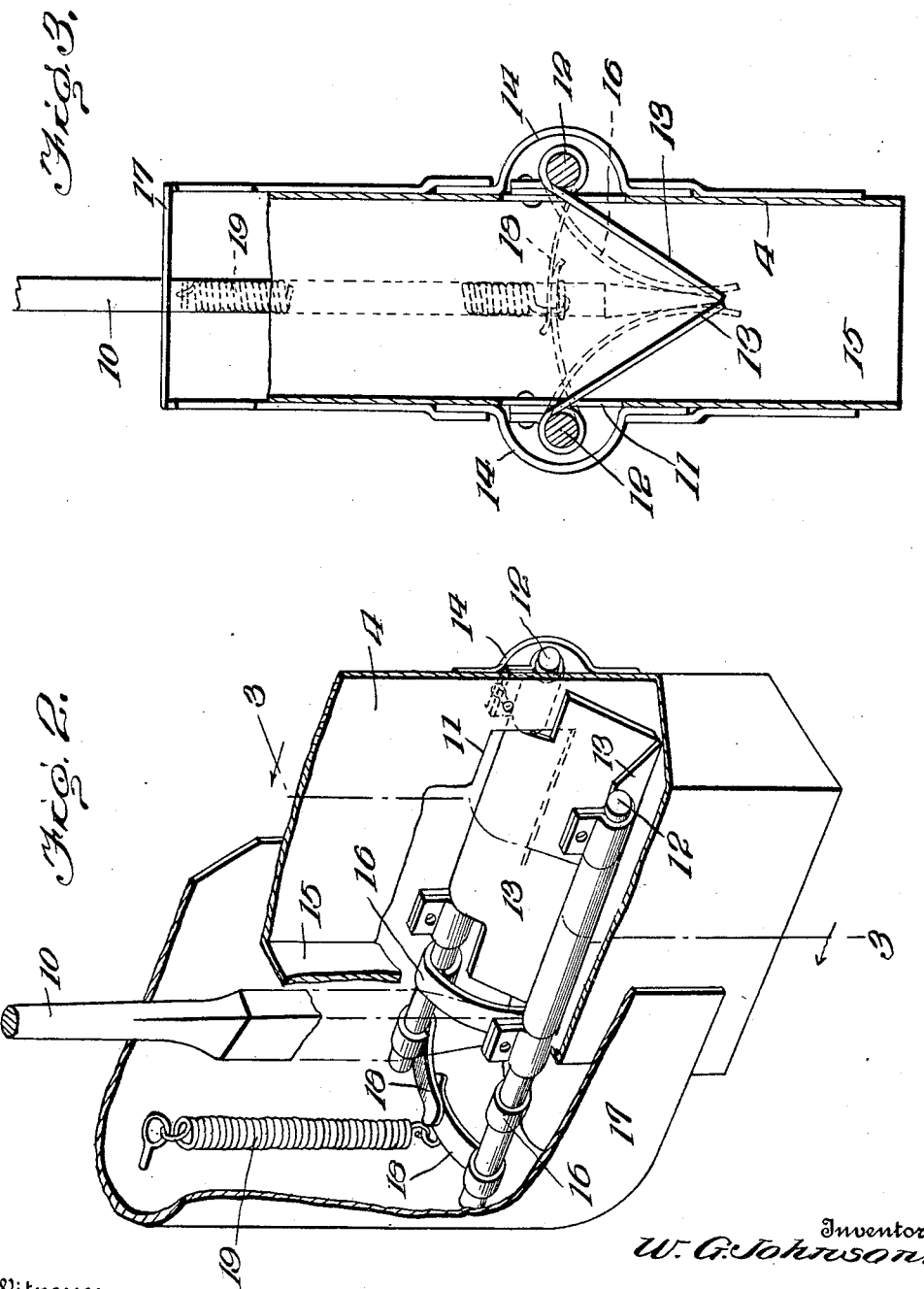

UNITED STATES PATENT OFFICE.

WILLIAM G. JOHNSON, OF KINGFISHER, OKLAHOMA.

CHECK-ROW COTTON-PLANTER.

1,101,801.  Specification of Letters Patent.  Patented June 30, 1914.

Application filed August 13, 1913. Serial No. 784,553.

*To all whom it may concern:*

Be it known that I, WILLIAM G. JOHNSON, citizen of the United States, residing at Kingfisher, in the county of Kingfisher and State of Oklahoma, have invented certain new and useful Improvements in Check-Row Cotton-Planters, of which the following is a specification.

This invention relates to cotton planters, and has special reference to the means for dropping the cotton seed to the ground, the primary object of the invention being to provide simple and efficient means whereby the seed will be dropped at regular intervals.

A further object of the invention is to provide a seed dropping mechanism which will be so located that it will offer no obstruction to the flow of the seed through the seed tube and will be so constructed that it will be normally closed and will quickly return to the closed position after being operated.

Other incidental objects of the invention will appear as the description of the same proceeds.

The invention is fully illustrated in the accompanying drawings and consists in certain novel features which will be hereinafter first fully described and then more particularly pointed out in the appended claims.

In the drawings: Figure 1 is a perspective view of a planter having my improvements applied thereto; Fig. 2 is an enlarged perspective view of the seed dropping mechanism with parts broken away and parts in section; Fig. 3 is a transverse vertical section taken on the line 3—3 of Fig. 2.

The planter frame 1 may be of the usual construction and is equipped with runners or shoes 2 at its front end. Hoppers 3 are mounted upon the frame and seed tubes 4 depend from the hoppers to the lower rear ends of the shoes so as to convey the seed from the hoppers to the ground, as will be readily understood. Upon the frame 1 is journaled a rock shaft 5 equipped with forked or bifurcated lever arms 6 at its ends and through the forks of the said lever arms check wires 7 pass, the said check wires being stretched across the field in the usual manner and being equipped with strikers or knots 8 of any well-known or preferred construction. The rock shaft 5 is arranged in rear of the hoppers 3 and is equipped with rearwardly extending arms 9 to which are swiveled the upper ends of plungers 10 which depend from the said arms in rear of the seed tubes and have their lower ends tapered, as indicated in Fig. 2. In the sides of the seed tubes 4, near the lower ends thereof, are formed slots 11, and upon the outer faces of the sides of the seed tubes in alinement with the said slots are journaled rock shafts 12 to which are secured, by brazing or otherwise, dropper valves 13 which extend obliquely downward from the rock shafts within the seed tubes, as shown. To prevent the access of dirt or other foreign matter to the seed tube, I secure hoods 14 to the outer sides of the said tubes, which hoods extend over the rock shafts and the valves, as clearly shown. The rock shafts extend through the rear walls 15 of the seed tubes and the valves should be of such length that their ends will fit closely to the front and rear walls of the tubes so that the flow of seed around the ends of the valves will be prevented. Upon the rearwardly projecting portions of the said rock shafts and in the vertical plane of the plungers 10, I secure tappets 16 which will be actuated by the plunger when the same descends so that the valves will be opened and the seed permitted to drop.

A supplemental casing 17 is provided around the rearwardly projecting portions of the rock shafts 12 and this casing 17 incloses the tappets 16 and the lower end of the plunger 10, as shown. Immediately adjacent the rear wall of this supplemental casing 17 the rock shafts are equipped with lifters or fingers 18 and a coiled spring 19 is secured to the said casing above the said fingers or lifters and is also connected to the said lifters so as to normally hold the same in a raised position.

It will be understood, of course, that a single rock shaft and a single valve may be employed in each seed tube, the valve being of sufficient width to extend entirely across the tube. I prefer, however, to employ narrower valves and arrange two valves in each seed tube, so that the lower edges of the valves will meet in the central vertical longitudinal plane of the seed tubes, as illustrated. When a single valve is employed, the spring 19 will, of course, be attached to the finger or lifter of the rock shaft carrying the valve, but when two valves are employed, as shown, the lifter finger on one rock shaft will overlap the finger on the other rock shaft so that the spring will normally hold the said fingers in the raised position, while, at the same time, permitting them to rock downwardly without becoming entirely disengaged.

It is thought the operation of the device will be readily understood from the foregoing description, taken in connection with the accompanying drawings. The seed is placed in the hoppers 3 and will flow through the seed tubes to the dropper valves 13 and will be held and supported by the said valves. As the planter is drawn over the field the lever arms 6 will be drawn against the successive strikers 8 on the check wires and will be thereby rocked rearwardly so that the rock shaft 5 will be turned and the arms 9 on the said shaft swung downwardly so as to depress the plungers 10. The downward movement of the plungers 10 will carry the lower ends thereof against and between the tappets 16, so that the said tappets will be swung downwardly and outwardly toward the sides of the casing and the dropper rock shafts 12, thereby vibrated. As the said shafts 12 are vibrated, the dropper valves will, of course, be opened and the seed for one hill permitted to escape. As soon as the striker clears the lever arm 6, the spring 19 will retract and return the parts to the normal position.

It will be readily noted that all the parts of my dropping mechanism are inclosed so that they are not liable to be broken or rendered inoperative and the device will operate with precision and speed. The mechanism is composed of very few parts which are simple in their construction and compactly arranged so that the weight of the planter will not be materially increased and the cost of manufacture and maintenance will be kept at an economical basis.

What I claim is:—

1. In a planter, the combination with a planter frame of a stationary seed tube secured to and depending from the frame, a vibratory valve mounted within the seed tube, and means mounted upon the planter frame adjacent the seed tube for actuating said valve.

2. In a planter, the combination with a planter frame, and a stationary seed tube secured thereto and depending therefrom, of a dropper valve disposed within the seed tube, a plunger mounted adjacent the seed tube, means for reciprocating the said plunger, and means whereby the reciprocation of the plunger will vibrate the valve.

3. In a planter, the combination with a planter frame, and a stationary seed tube depending therefrom, of a vibratory valve mounted upon and carried by the side of the seed tube and extending across the interior of the same, a plunger disposed adjacent and external to the seed tube, means actuated by the plunger to open the valve, and means acting on the valve in opposition to the plunger to hold the valve normally closed.

4. In a planter, the combination with a seed tube, of a rock shaft mounted upon the side of the seed tube, a dropper valve carried by the rock shaft and extending within the tube, a plunger acting upon the rock shaft to depress the valve, means for operating the plunger, and means acting on the rock shaft in opposition to the plunger to hold the valve normally raised.

5. In a planter, the combination with a seed tube, of a rock shaft mounted upon the side of the seed tube, a dropper valve fixed upon said shaft and extending across the interior of the tube, a tappet upon the said shaft, a plunger acting upon said tappet to lower the valve, means for operating the plunger, and means acting upon the rock shaft to hold the valve normally raised.

6. In a planter, the combination with a seed tube, of a rock shaft mounted upon the side of the seed tube, a valve fixed upon the rock shaft and extending across the interior of the seed tube, a tappet upon the rock shaft, a plunger acting upon said tappet to vibrate the rock shaft and lower the valve, means for actuating the plunger, a lifter secured to the rock shaft, and means acting on the said lifter to hold the valve normally raised.

7. In a planter, the combination with a seed tube, of rock shafts journaled upon the sides of the seed tube, dropper valves fixed to the said rock shafts and converging downwardly within the seed tubes, tappets secured upon the rock shafts and having their inner ends arranged in juxtaposition and below the rock shafts, a plunger having its lower end disposed between said tappets, means for depressing said plunger, lifters secured to the rock shafts and having their inner ends overlapping, and a spring acting upon the under lifter to hold the valves normally together.

In testimony whereof I affix my signature in presence of two witnesses.

WILLIAM G. JOHNSON. [L. S.]

Witnesses:
C. P. BLAKEY,
GEORGE F. LONG.

---

Copies of this patent may be obtained for five cents each, by addressing the "Commissioner of Patents, Washington, D. C."